US006820856B2

(12) United States Patent
Grill (10) Patent No.: US 6,820,856 B2
(45) Date of Patent: Nov. 23, 2004

(54) MANUALLY-OPENED AND LATCHABLE WITH ONLY RESIDUAL MAGNETISM, TWO-WAY TWO-POSITION FLUID CONTROL VALVE ASSEMBLY AND METHODS OF OPERATION

(75) Inventor: Benjamin Grill, Woodland Park, CO (US)

(73) Assignee: Sturman BG, LLC, Woodland Park, CO (US)

( * ) Notice: Subject to any disclaimer, the term of this patent is extended or adjusted under 35 U.S.C. 154(b) by 134 days.

(21) Appl. No.: 10/356,177

(22) Filed: Feb. 1, 2003

(65) Prior Publication Data

US 2004/0149947 A1 Aug. 5, 2004

(51) Int. Cl.[7] ............................................. F16K 31/02
(52) U.S. Cl. ...................... 251/68; 251/74; 251/129.05; 251/129.16
(58) Field of Search ............................. 251/68, 74, 66, 251/70, 129.05, 129.07, 129.16, 129.02

(56) References Cited

U.S. PATENT DOCUMENTS

| 2,322,911 A | | 6/1943 | Beam ........................ 137/144 |
| 2,695,154 A | | 11/1954 | Dillman ........................ 251/77 |
| 2,826,215 A | | 3/1958 | Wolfslau et al. .......... 137/454.6 |
| 3,304,048 A | | 2/1967 | Roberts ...................... 251/138 |
| 3,414,231 A | | 12/1968 | Kreuter ........................ 251/11 |
| 3,534,770 A | | 10/1970 | Kowalski .................... 137/509 |
| 3,683,239 A | | 8/1972 | Sturman ...................... 317/150 |
| 3,743,898 A | | 7/1973 | Sturman ...................... 317/154 |
| 3,952,774 A | * | 4/1976 | Loveless .................. 251/129.15 |
| 3,977,649 A | * | 8/1976 | Zeuner et al. ................ 251/82 |
| 3,985,333 A | | 10/1976 | Paulsen ....................... 251/129 |
| 4,128,105 A | | 12/1978 | Follett ............................ 137/1 |
| 4,180,088 A | | 12/1979 | Mallett ........................ 137/87 |
| 4,409,638 A | | 10/1983 | Sturman et al. ............. 361/152 |
| 4,488,567 A | | 12/1984 | Grant ........................ 137/78.1 |
| 4,501,290 A | | 2/1985 | Sturman et al. ............. 137/495 |
| 4,589,435 A | | 5/1986 | Aldrich ....................... 137/102 |
| 4,624,285 A | | 11/1986 | Perach ................... 137/625.65 |
| 4,641,686 A | | 2/1987 | Thompson ............. 137/625.65 |

(List continued on next page.)

FOREIGN PATENT DOCUMENTS

| DE | 1 169 562 | 5/1964 |
| DE | 1 550 322 | 1/1969 |
| DE | 1 550 632 | 1/1970 |
| DE | 1 475 930 | 10/1970 |
| FR | 1 496 822 | 8/1967 |
| GB | 1 526 630 | 9/1978 |

OTHER PUBLICATIONS

Copy of eight–page excerpt from May 6, 2004 Internet website of SONIN, Inc. featuring Water Alarm with Remote Sensor (Model #00700) and also Wireless Water Alarm.
Water No–Go Valve System by B & I LLC, 9–page excerpt printed on Mar. 21, 2003 from http://www.waternogovalve.com Internet web site.
Water No–Go Valve System advertisement, p. 30, Hardware Trade Magazine vol. 112, No. 5, Sep./Oct. 2002.

(List continued on next page.)

Primary Examiner—John Bastianelli
(74) Attorney, Agent, or Firm—Anthony N. Woloch (57) ABSTRACT

A disclosed is a 2-way 2-position fluid control valve assembly operable to manually open and automatically block fluid flow therethrough. The fluid control valve assembly includes a valve and an electromagnetic actuator having an armature and a pole piece. The valve is biased to its closed position whereat the armature is spaced away from the pole piece. The armature is manually movable to contact the pole piece while opening the valve. The armature and the pole piece are latchable together, with only residual magnetism, only when there is zero air gap or substantially zero air gap between the armature and the pole piece. When latched, the armature and the pole piece remain in that state until they are delatched by canceling at least enough of the residual magnetism so that the biased valve closes while the armature moves away from the pole piece.

38 Claims, 7 Drawing Sheets

U.S. PATENT DOCUMENTS

| | | | |
|---|---|---|---|
| 4,705,070 A | 11/1987 | Eidsmore | 137/614.21 |
| 4,741,365 A | 5/1988 | Van Ornum | 137/625.65 |
| 4,870,892 A | 10/1989 | Thomsen et al. | 91/361 |
| 4,880,030 A | 11/1989 | Terry | 137/460 |
| 5,007,458 A | 4/1991 | Marcus et al. | 137/625.5 |
| 5,020,772 A * | 6/1991 | Degenfelder et al. | 251/129.07 |
| 5,038,820 A | 8/1991 | Ames et al. | 137/624.11 |
| 5,050,840 A * | 9/1991 | Kondo et al. | 251/129.15 |
| 5,076,321 A | 12/1991 | Terry | 137/460 |
| RE34,261 E | 5/1993 | Sule | 137/625.5 |
| 5,209,454 A | 5/1993 | Engdahl et al. | 251/65 |
| 5,240,022 A | 8/1993 | Franklin | 137/1 |
| 5,267,587 A | 12/1993 | Brown | 137/624.12 |
| 5,345,857 A | 9/1994 | Murphy | 92/34 |
| 5,409,037 A | 4/1995 | Wheeler et al. | 137/551 |
| 5,470,043 A | 11/1995 | Marts et al. | 251/65 |
| 5,513,395 A | 5/1996 | Chlebek et al. | 4/329 |
| 5,598,871 A | 2/1997 | Sturman et al. | 137/625.65 |
| 5,622,351 A | 4/1997 | Kim | 251/30.03 |
| 5,640,987 A | 6/1997 | Sturman | 137/1 |
| 5,718,264 A | 2/1998 | Sturman | 137/625.65 |
| 5,797,417 A * | 8/1998 | DeLattre et al. | 251/129.04 |
| 5,893,384 A | 4/1999 | Swenson | 137/39 |
| 5,894,856 A | 4/1999 | Swenson et al. | 137/38 |
| 5,927,314 A | 7/1999 | Velic et al. | 137/38 |
| 5,971,011 A | 10/1999 | Price | 137/460 |
| 6,085,772 A | 7/2000 | McGill et al. | 137/39 |
| 6,112,764 A | 9/2000 | Engdahl et al. | 137/554 |
| 6,116,276 A | 9/2000 | Grill | 137/596.17 |
| 6,234,202 B1 | 5/2001 | Grill | 137/596.17 |
| 6,253,785 B1 | 7/2001 | Shumake, Jr. et al. | 137/312 |
| 6,389,852 B1 | 5/2002 | Montgomery | 68/12.02 |
| 6,481,689 B2 | 11/2002 | Grill | 251/129.07 |

OTHER PUBLICATIONS

FloodStop Systems by OnSite PRO, Inc., 13–page excerpt printed on Feb. 26, 2003 from http://www.plumbingproducts.com and http://webwarper.net Internet web sites.

U.S. patent application Publication No. 2003/0005731 A1, published Jan. 9, 2003, Montgomery, Appliance Safety Valve Assembly, U.S. patent application No. 10/152,328 filed May 21, 2002.

U.S. patent application Publication No. US 2002/0148515 A1, published Oct. 17, 2002, Coffey et al, Water Monitoring System, U.S. patent application No. 10/122,525 filed Apr. 15, 2002.

Sturman et al., "Breakthrough in Digital Valves", *Machine Design*, pp. 37–40 & 42, Feb. 21, 1994.

"Balancing Act" by Richard J. Babyak, *Appliance Manufacturer Magazine*, pp. 65–66, May 1998.

"Early–Warning Alarm System Alerts You To Unwanted Water", advertisement for 118224D–Water Alarm, *High Street Emporium Catalog*, pp. 58, Late Spring 1998.

"Safety–Conscious, Energy–Saving Solenoid–less Digital Valves" by Joe Jancsurak, *Appliance Manufacturer Magazine*, pp. 41, Nov. 1998.

\* cited by examiner

FIG. 18

MANUALLY-OPENED AND LATCHABLE WITH ONLY RESIDUAL MAGNETISM, TWO-WAY TWO-POSITION FLUID CONTROL VALVE ASSEMBLY AND METHODS OF OPERATION

TECHNICAL FIELD

The present invention relates generally to fluid flow control valves for automatically shutting off the flow of fluids in response to one or more sensed conditions necessitating such shutoff and, more particularly, to two-way two-position fluid flow control valves that are latchable at their opened position with only residual magnetism.

BACKGROUND ART

Known automatic fluid shutoff valves include those disclosed in U.S. Pat. No. 4,501,290 issued to Sturman et al. on Feb. 26, 1985. In FIGS. 2–3 of Sturman et al., a pressure regulating electrically operable shutoff valve is shown having a permanent magnet 84 that is used to latch a third magnetic member 98 with a magnetic member 82. One disadvantage of using permanent magnets to help create a magnetic circuit is their inherent brittleness and consequent susceptibility to breaking if accidentally dropped during assembly or disassembly. Another disadvantage of permanent magnets is their tendency to constantly attract and collect magnetically attractive debris between the moving and stationary parts of the magnetic circuit. Such debris may, for example, be introduced during the assembly process. Such debris can prevent the moving and opposing stationary parts of the magnetic circuit from achieving substantially zero air gap therebetween and therefore prevent desired latching.

In FIGS. 1–2 of U.S. Pat. No. 6,481,689 B2 issued to Grill on Nov. 19, 2002, there is shown a two-way two-position fluid control valve having a solenoid 48. When the solenoid 48 is electrically actuated, an armature 58 is pulled into contact with a core 56 while a transfer tube 42, and a valve 26 coupled to the transfer tube 42, move from a first (closed) position shown in FIG. 1 to a second (opened) position shown in FIG. 2. While the fluid control valve of Grill is suitable for many applications, the solenoid 48 disclosed therein for both i) electromagnetically pulling the armature 58 (and valve 26) from its closed position to its opened position and ii) holding the armature 48 (and valve 26) in its opened position may be unsuitable for other applications. For example, it may be too expensive and/or too power consuming for certain automatic fluid shutoff applications, such as those found in various places of the common household.

It is therefore desirable to provide an automatic fluid shutoff valve that features simplicity of design and operation, energy efficiency, reliability, and relatively low manufacturing cost.

The present invention is directed to overcoming one or more of the problems as set forth above.

DISCLOSURE OF THE INVENTION

In one aspect of the present invention, there is disclosed a 2-way 2-position fluid control valve assembly operable to selectively open and block fluid flow therethrough. The fluid control valve assembly includes a valve and an electromagnetic actuator having a movable armature portion and a stationary stator portion. The valve is biased to its closed position whereat the armature portion is spaced away from the stator portion. The armature portion is manually movable to contact the stator portion while opening the valve. The armature portion and stator portion are latachable together, with only residual magnetism, only when there is zero air gap or substantially zero air gap between the armature portion and the stator portion. When latched, the armature portion and the stator portion remain in their latched state with the valve maintained at its opened position until the armature portion and the stator portion are delatched by canceling at least enough of the residual magnetism so that the biased valve closes while the armature portion moves away from the stator portion.

In another aspect of the present invention, there is disclosed a method of operating a 2-way 2-position fluid control valve assembly including a valve and an electromagnetic actuator having an armature portion and a stator portion. The method comprises the steps of biasing the valve to its closed position whereat the armature portion is spaced away from the stator portion, opening the valve by manually moving the armature portion into zero air gap or substantially zero air gap with the stator portion, maintaining the valve at its opened position by latching the armature portion and the stator portion together with only residual magnetism, and closing the valve by canceling at least enough of the residual magnetism between the armature portion and the stator portion to allow the biased valve to move to its closed position.

The subject invention advantageously provides a two-way two-position fluid control valve assembly for automatically shutting off fluid flow in various household and commercial applications. The control valve assembly advantageously features simplicity of design and operation, energy efficiency, reliability, and relatively low cost to manufacture.

BEST MODE FOR CARRYING OUT THE INVENTION

Referring to FIGS. 1–18, wherein similar reference numbers or characters designate similar elements or features throughout the Figs., there is shown an exemplary embodiment of a manually-opened and latchable, with only residual magnetism, two-way two-position fluid control valve assembly of the present invention. The control valve assembly is operable to only selectively fully open or completely block fluid flow therethrough.

Referring to FIGS. 1–5, the control valve assembly 10 includes a valve housing 15, a movable force transfer member 20 (FIG. 5), a valve 25 for opening and blocking fluid communication through the control valve assembly, a non-electrical biasing means 30, an electromagnetic actuator 35, a manually-operated reset device 40, an electronic control module 45, a source 50 of electrical current, one or more sensors (55,60), a first pressure responsive means or device 65, and a second pressure responsive means or device 70.

Figure 1:
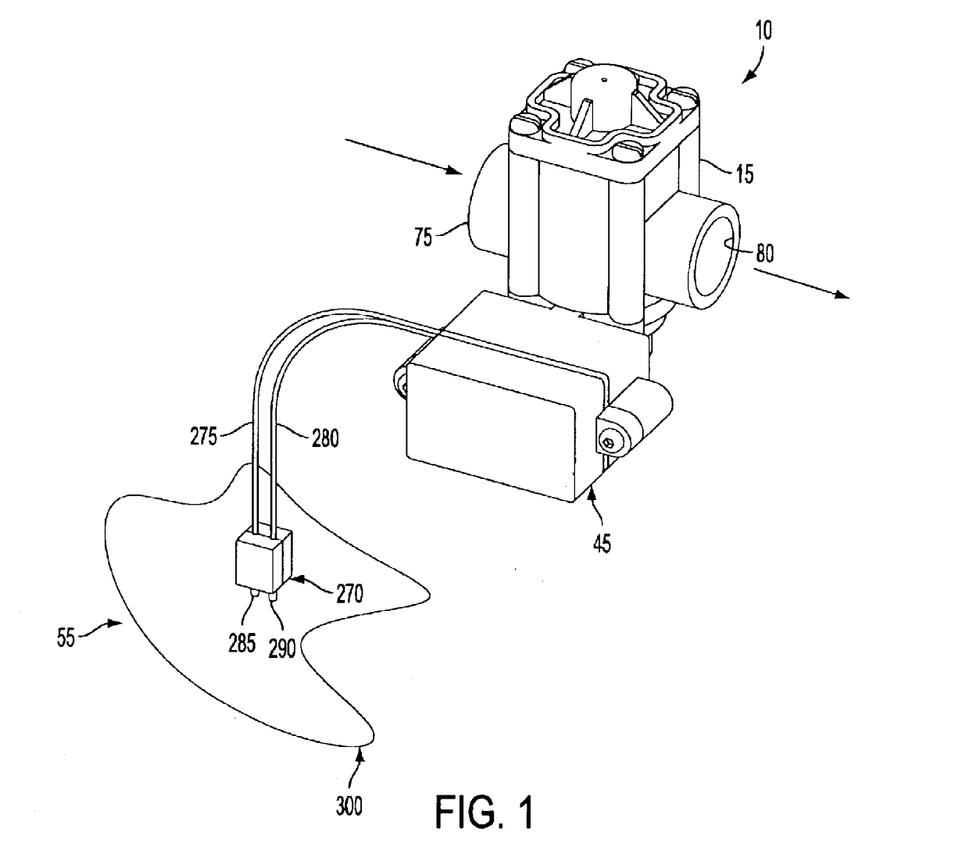
FIG. 1 is a perspective external view of an exemplary embodiment of a manually-opened and latchable, with only residual magnetism, two-way two-position fluid control valve assembly of the present invention.
Figure 2:
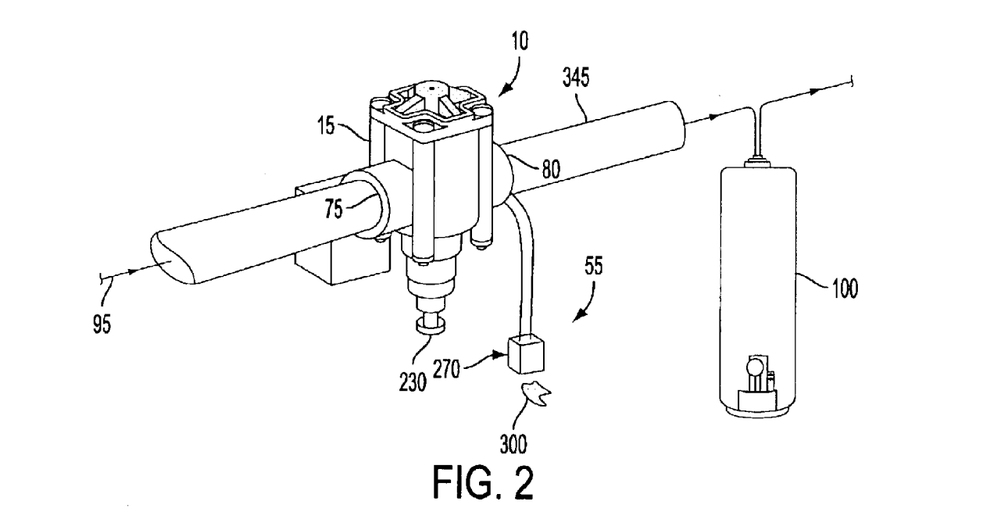
FIG. 2 is another perspective view of the control valve assembly of FIG. 1 but shown connected to an exemplary fluid supply system, only partially shown, wherein an internal valve of the control valve assembly is at its opened position to allow fluid flow therethrough.
Figure 3:
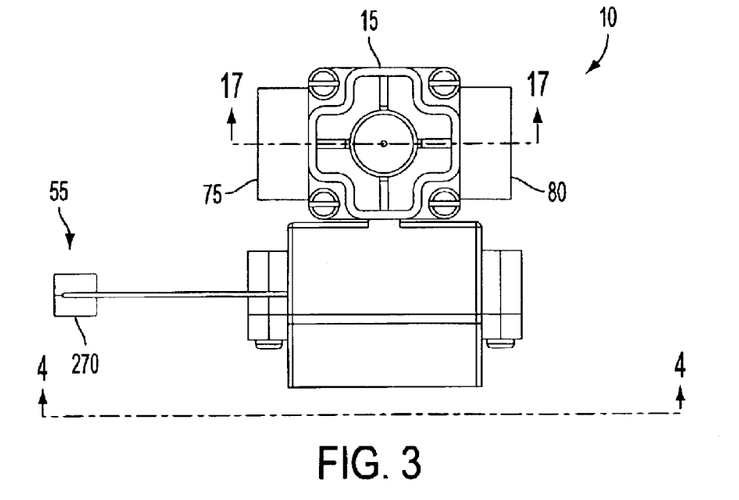
FIG. 3 is a top plan view of the control valve assembly of FIG. 1.
Figure 5:
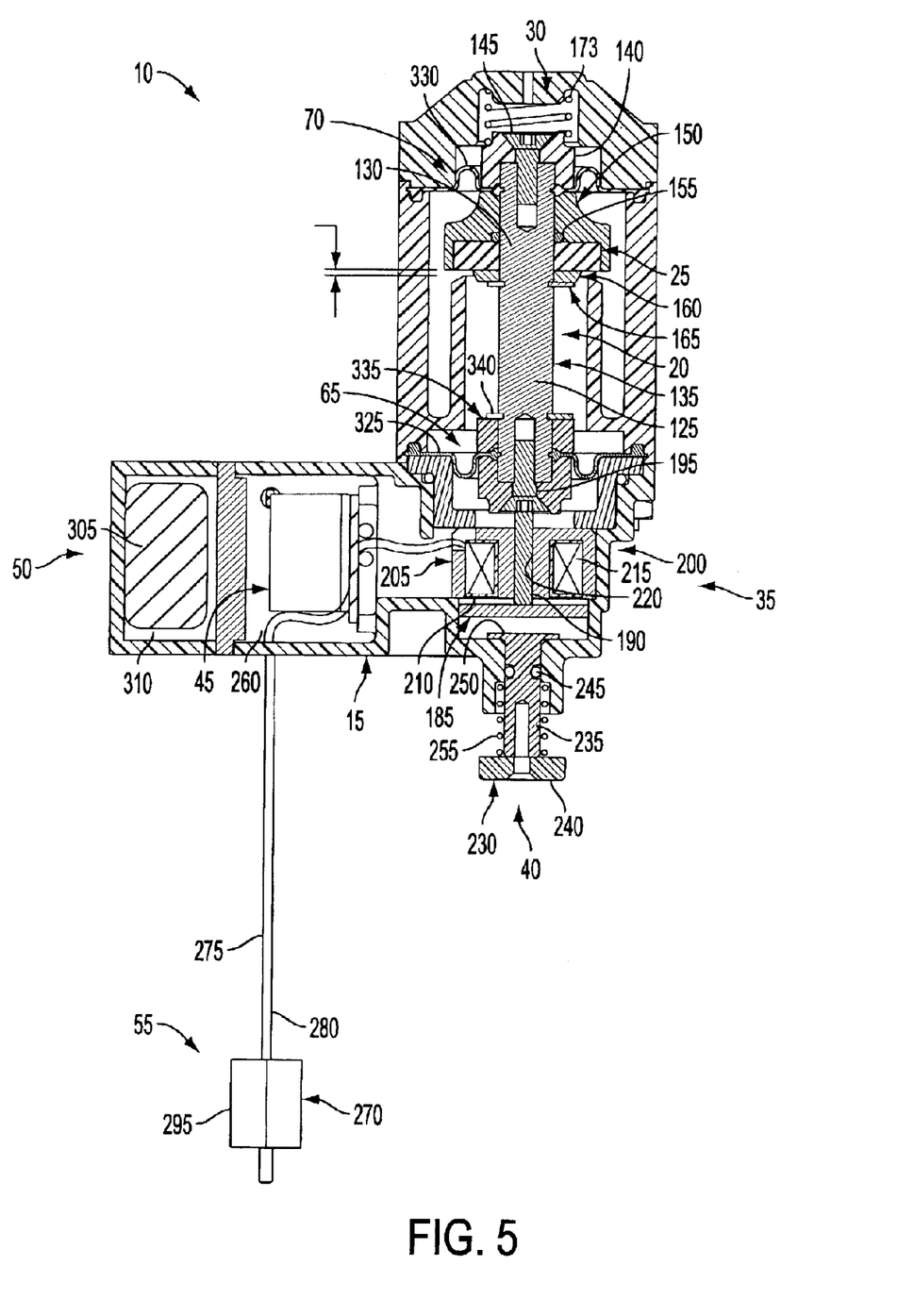
FIG. 5 is a cross-sectional view of the control valve assembly taken generally along line 5—5 of FIG. 4 wherein the internal valve of the control valve assembly is shown about half way between its fully opened and fully closed positions.
Figures 6, 7:
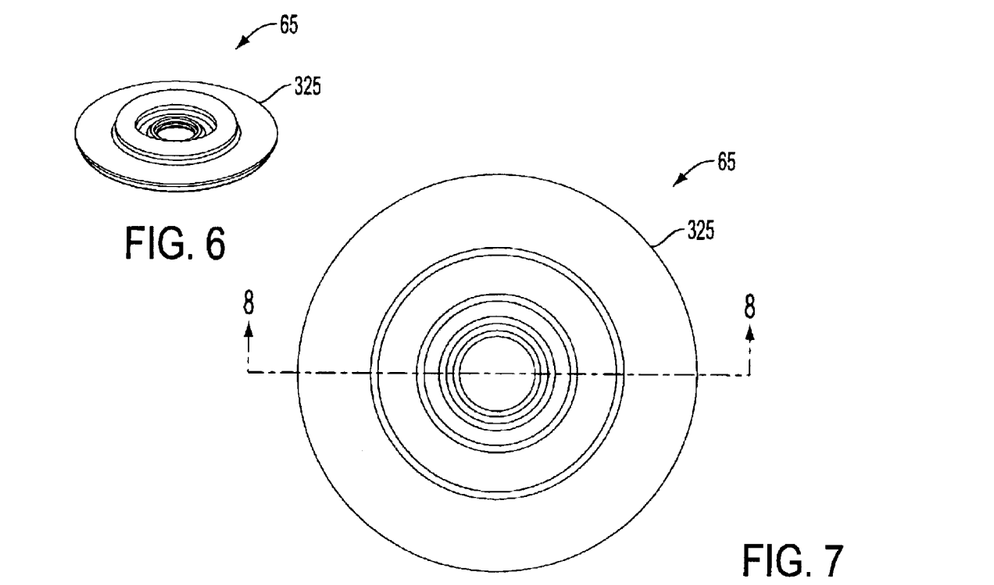
FIG. 6 is an isolated and reduced perspective view of one of the two identical diaphragms of the control valve assembly shown in FIG. 5.
FIG. 7 is an isolated enlarged top plan view of the diaphragm of FIG. 6.
Figure 8:
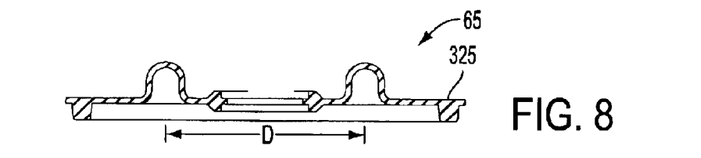
FIG. 8 is a cross-sectional view of the diaphragm taken generally along line 8—8 of FIG. 7.
Figure 9:
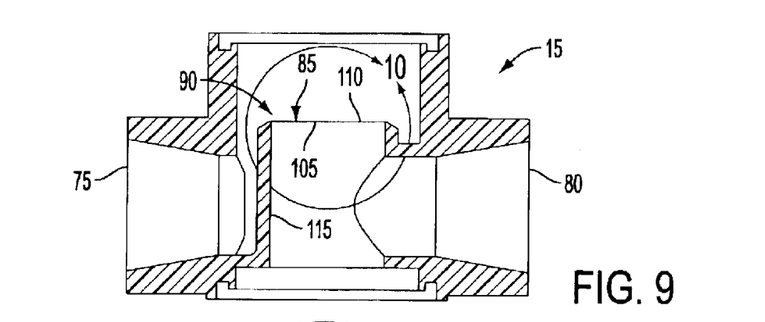
FIG. 9 is an isolated and perpendicular cross-sectional view of the valve housing of the control valve assembly shown in FIG. 5.
Figure 10:
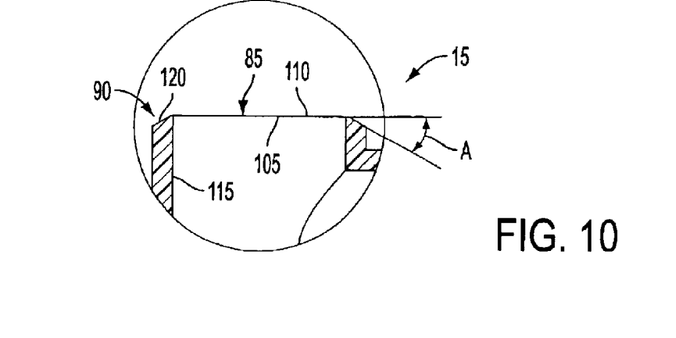
FIG. 10 is an enlarged partial view of the valve housing taken generally within region 10 of FIG. 9.
Figure 11:
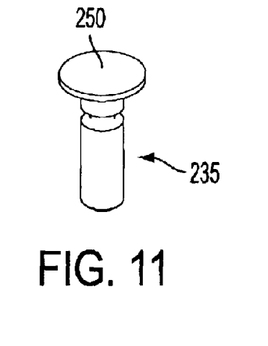
FIG. 11 is an isolated external perspective view of the reset pin of the control valve assembly shown in FIG. 5.
Figure 12:
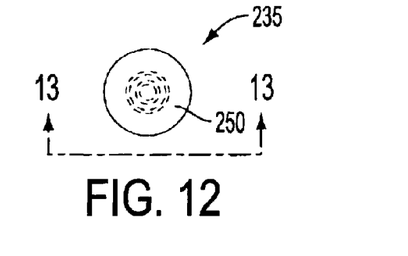
FIG. 12 is a top plan view of the reset pin shown in FIG. 11.
Figure 13:
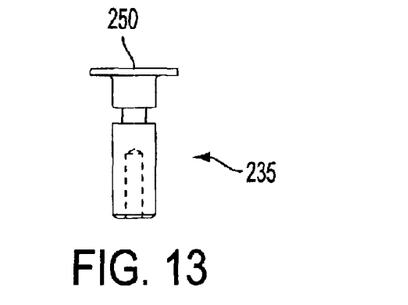
FIG. 13 is a side view of the reset pin taken generally along line 13—13 of FIG. 12.
Figure 14:
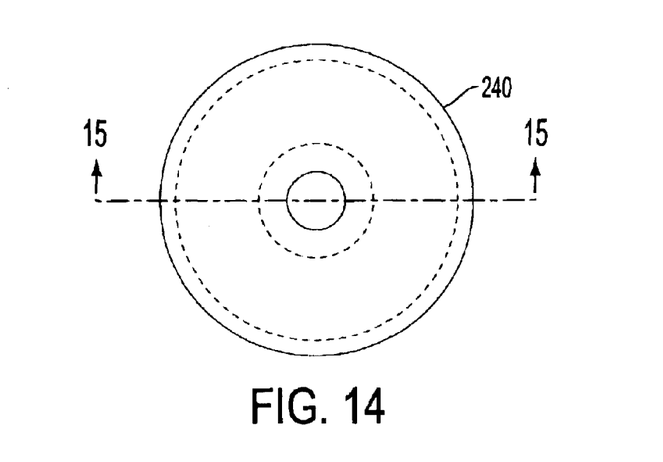
FIG. 14 is an isolated and enlarged top plan view of the reset cap of the control valve assembly shown in FIG. 5.
Figure 15:
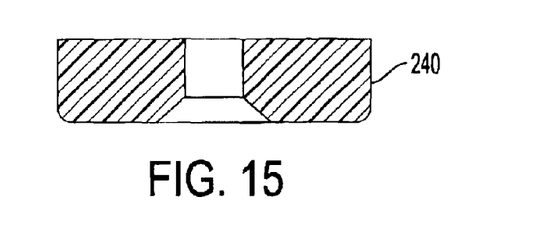
FIG. 15 is a cross-sectional view of the reset cap taken generally along line 15—15 of FIG. 14.

Referring to FIGS. 5, 9, and 10, the valve housing 15 defines an external first fluid connection port 75, an external second fluid connection port 80, an internal valve port 85, and an annular valve seat 90 circumscribing the valve port. As shown in FIG. 2, for example, the first fluid connection port may be an inlet port adapted to be connected to a source 95 of fluid and the second fluid connection port may be an outlet port adapted to be connected to an appliance 100 or other fluid-using device.

The term valve port is used herein to mean the open area defined by the valve seat and selectively opened and closed by the valve. The valve port has an effective fluid flow area, a first side 105, and an opposite second side 110. The valve seat may extend from an inner sleeve 115 integrally formed in the valve housing. In the exemplary embodiment show, the annular valve seat is tapered to form an annular knife-like edge 120 so that the area of contact between the valve and the valve seat is minimized when the valve is at its fully closed position. Preferably, the valve housing is formed of a tough rigid plastic material such as acrylonitrile-butadiene-styrene (ABS) or other material suitable for the fluid to be controlled and other specifications of a respective application for the control valve assembly.

The movable member 20 is positioned within the valve housing and has a first end portion 125 and a second end portion 130. The movable member extends through the valve port with the first end portion of the movable member extending through the first side of the valve port. The movable member is preferably rigid and includes an elongated shaft 135. In the exemplary embodiment, the shaft is formed of a stainless steel alloy material such as 303 stainless steel.

In the exemplary embodiment shown, exactly one and only one valve 25 controls only whether or not fluid flows through the valve port. The valve cooperates with the valve seat to close the valve port. The valve is rigidly connected to the movable member between the first and second end portions. The valve is located adjacent to the second side of the valve port. The movable member and the valve are selectively movable together to i) a fully opened position at which the valve opens the valve port to allow fluid communication between the first fluid connection port and the second fluid connection port or to ii) a fully closed position at which the valve completely blocks the valve port to completely block fluid communication between the first fluid connection port and the second fluid connection port.

In the exemplary embodiment shown, the valve is a flat poppet valve that is selectively i) at its fully opened position (FIG. 17), spaced away from the valve port to allow fluid communication between the first fluid connection port and the second fluid connection port and ii) at its fully closed position (FIG. 18), positively seated against the valve port to completely block fluid communication between the first fluid connection port and the second fluid connection port. The valve is rigidly connected to the movable member, between the first and second end portions, by an upper retainer 140, a threaded faster 145 connected to the shaft, a valve retainer 150, an o-ring seal 155, a washer support 160, and an e-ring clip 165.

Figure 17:
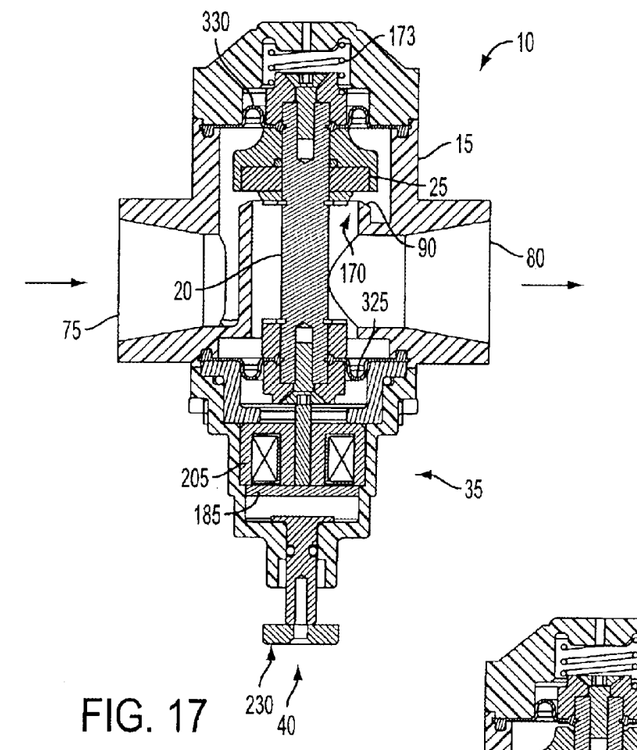
FIG. 17 is a cross-sectional view of the control valve assembly taken generally along line 17—17 of FIG. 3 wherein the internal valve of the control valve assembly is shown at its fully opened position.

As shown in FIG. 17, this poppet valve arrangement advantageously provides a relatively large fluid flow area or annular gap 170 that minimizes the fluid pressure drop produced across the valve and is relatively less susceptible to clogging compared to conventional spool valves with relatively smaller fluid passages. In the exemplary embodiment shown for a 0.75 inch (19 millimeter) nominal inside diameter water supply line application, the valve port has an inside diameter of about 0.85 to 0.87 inches (about 21.6 to 22.1 millimeters) and can be spaced away from the valve seat a maximum distance of about 0.8 inches (about 20.3 millimeters). In the exemplary embodiment shown, the poppet valve is formed from a rubber material that is relatively more compliant than the valve seat of the valve housing. For example, the rubber material of the valve may be formed of Buna N having a hardness in the range of about 70 to 75 Shore, inclusive. For example, the upper retainer and the valve retainer may each be formed from a tough rigid plastic material such as acrylonitrile-butadiene-styrene (ABS) or other material suitable for the fluid to be controlled. The washer support may, for example be formed from a stainless steel alloy material such as 303 stainless steel.

The non-electrical biasing means 30 is provided for biasing the movable member so that the movable member and the valve are biased towards their fully closed position. In the exemplary embodiment shown, the biasing device includes a return spring 173, such as a mechanical compression spring, arranged to bias the second end portion of the movable member so that the valve is biased to its fully closed position.

The electromagnetic actuator 35 includes a movable armature portion 175 and an opposing stationary stator portion 180 directly facing the armature portion. The armature portion of the electromagnetic actuator includes a flat disc armature 185 slidably guided with the valve housing, a separate armature rod 190, and another threaded fastener 195 rigidly connected to the first end portion of the movable member. Alternatively, the armature and the armature may be integrally formed as one piece. The actuator rod may be formed, for example, from a stainless steel alloy material such as 303 stainless steel. The stator portion of the electromagnetic actuator includes a coil assembly 200 and a pole piece 205. The coil assembly includes a bobbin 210 and a coil 215 of wire wound around the bobbin. The bobbin is mounted to the pole piece and the armature rod is slidably positioned in an internal through bore 220 of the pole piece. In the exemplary embodiment shown, the bobbin is formed of a tough rigid plastic material such as acrylonitrile-butadiene-styrene (ABS) or other suitable material. The wire diameter of the coil is about #27 AWG (about 0.0142 inches/about 0.36 millimeters diameter), the number of turns is about 234, and the resistance is about 1.85 Ohms.

Each of the armature and the pole piece are formed of non-permanent magnetic material having the following properties. In response to the latching digital pulse of electrical current, such non-permanent magnetic material selectively develops enough residual magnetism to maintain the armature in contact with the pole piece even after electrical current to the electromagnetic actuator is terminated. Moreover, in response to the unlatching digital pulse of reverse electrical current, such non-permanent magnetic material allows permanent cancellation of at least enough of such residual magnetism to allow the biasing means to move the movable member so that the valve is simultaneously moved to its fully closed position while the armature separates from contact with the pole piece. For example, the non-permanent magnetizable material of each of the armature and the pole piece may be formed of AISI 4140 hardened steel alloy or other materials having similar desirable non-permanent magnetic properties. The coil can thus be operated in a digital rather than analog manner. The attractive residual magnetism of the armature and the pole piece acts as a latching force that maintains the armature in contact with the pole piece even after electrical current to the coil is terminated. Latching the armature and the pole piece together with only a digital pulse of electrical current and resultant residual magnetism, while the valve is at its fully opened and latched position, advantageously consumes no electrical energy compared to conventional analog control valves that require a continuous supply of electrical current to maintain one or more positions of the valve. Moreover, electrical energy can be advantageously conserved especially because the armature is manually moved into contact with the pole piece rather than requiring that the electromagnetic actuator do such work with electrical current. This enables the electromagnetic actuator to be of a smaller capacity and size and also cost less to manufacture The arrangement of the valve and armature is such that i) the valve is at its fully opened position when the armature contacts the pole piece and ii) the valve is at its fully closed position when the armature is spaced away from the pole piece. The electromagnetic actuator is preferably minimized in capacity so that it is incapable of electromagnetically moving the armature towards the pole piece when the armature and the pole piece define an air gap 225 therebetween greater than substantially zero. The electromagnetic actuator is operable to selectively i) receive a latching digital pulse of electrical current and thereby latch, with only residual magnetism after termination of such electrical current, the armature and the pole piece together only when the armature and the pole piece are located at zero air gap or substantially zero air gap of each other and ii) receive an unlatching digital pulse of reverse electrical current and thereby permanently cancel at least enough of such residual magnetism to allow the biasing means to move the movable member so that the valve moves to its fully closed position while the armature moves away from the pole piece.

The manually-operated reset device 40 is operable to manually open the valve by moving the armature into contact with the pole piece and then by moving the armature, without lost motion, until there is zero air gap or substantially zero air gap between the armature and the pole piece.

The reset device includes an externally disposed and manually-operated first push button 230 operable to directly contact and push the armature without electrical energy into contact with the pole piece with at least substantially zero air gap therebetween. In the exemplary embodiment shown in FIGS. 5 and 11–15, the first push button includes a reset pin 235, a cap 240, and an o-ring seal 245. The rest pin has an enlarged flat end portion 250 directly facing the armature of the electromagnetic actuator. Preferably, the reset pin and cap are formed from nonmagnetic tough rigid plastic material such as acrylonitrile-butadiene-styrene (ABS). Optionally, the push button may further include another return spring 255 (FIG. 5), such as a mechanical compression spring, arranged to bias the reset pin away from the armature. However, if the first push button is pushed, the return spring 255 allows allow direct contact between the rest pin and the armature and subsequent common movement without lost motion.

The electronic control module 45 is positioned within a separate electronic compartment 260 of the valve housing and operable to selectively send to the electromagnetic actuator one of i) the latching digital pulse of electrical current to latch the armature and the pole piece together with only residual magnetism after such electrical current is terminated and ii) the unlatching digital pulse of reverse electrical current to cancel at least enough residual magnetism to allow the biasing means to move the movable member so that the valve is moved to its fully closed position while the armature moves away from the pole piece. The electronic control module includes an electronic control circuit 265, such as, for example, the one shown in FIG. 16 that is further described below.

At least of the sensors 55 is operable to sense for at least one condition (such as an environmental, emergency or a preventive maintenance event) necessitating closure of the valve and provide a signal indicative of such sensed condition to the electronic control module that, in response, is operable to send the unlatching digital pulse of reverse electrical current to the electromagnetic actuator to allow closure of the valve by the biasing means. Such sensed for conditions may include, for example, fluid leakage, excessive fluid flow, excessive time duration of fluid flow, fluid flooding, undesirable temperatures, undesirable pressures, undesirable ph values, smoke, fire, seismic events, explosions, and/or any other parameters or combinations of parameters desired.

In the exemplary embodiment shown in FIGS. 1–5, the sensor 55 includes a fluid probe 270, such as a moisture probe, comprised of a pair of electrical conductor lines (275,280), a pair of sensor pins (285,290), and a sensor housing 295. In the exemplary embodiment shown, the electrical conductor lines are formed of 18 AWG electrical conductor wire, the sensor pins are formed from brass with a nickel plate finish, and the sensor housing is formed from a tough rigid plastic material such as acrylonitrile-butadiene-styrene (ABS) or other suitable material. The electrical conductor lines are operable to sense electrical conductively therebetween to signal the presence of undesirable fluid. The fluid probe may be located generally on the floor adjacent to or under the appliance to detect fluid leakage 300 therefrom. A relatively simple fluid probe may be used for such a purpose provided the probe has two electrical conductors that are separated from one another but are positioned in sufficient proximity so that if leaking fluid contacts both electrical conductors, there will be sufficient electrical conductivity therebetween for sensing of the electrical circuit completed by the fluid leakage.

The source 50 of electrical current is operable to provide electrical power to the electronic control module. In the exemplary embodiment shown, the source of electrical current is a conventional replaceable direct-current 9-volt battery 305. The battery is positioned within a separate battery compartment 310 of the valve housing and is operable to provide electrical current to the electronic control module. Electrical energy is consumed only when the armature and the pole piece are latched together with residual magnetism or unlatched via permanent cancellation of at least a portion of such residual magnetism. Electrical energy of the battery is advantageously conserved since electrical energy therefrom is not needed to (manually) move the movable member and the valve to their fully opened position or to return them to their fully closed position. Electrical energy of the battery is also advantageously conserved since the armature and the pole piece can be latched together (with the movable member and the valve at their opened position) without requiring a continuous supply of electrical current. Alternatively, the control valve assembly may be powered by a 110-volt source of electrical current such as a conventional electrical outlet (not shown).

Optionally, one of the sensors 60 is operable to send to the electronic control module a signal indicative of the voltage across the battery. The electronic control module, in turn, is operable to send to the electromagnetic actuator the unlatching digital pulse of reverse electrical current, to allow closure of the valve by the biasing means, in response to the signal indicating the voltage has fallen below a predetermined level.

Figure 4:
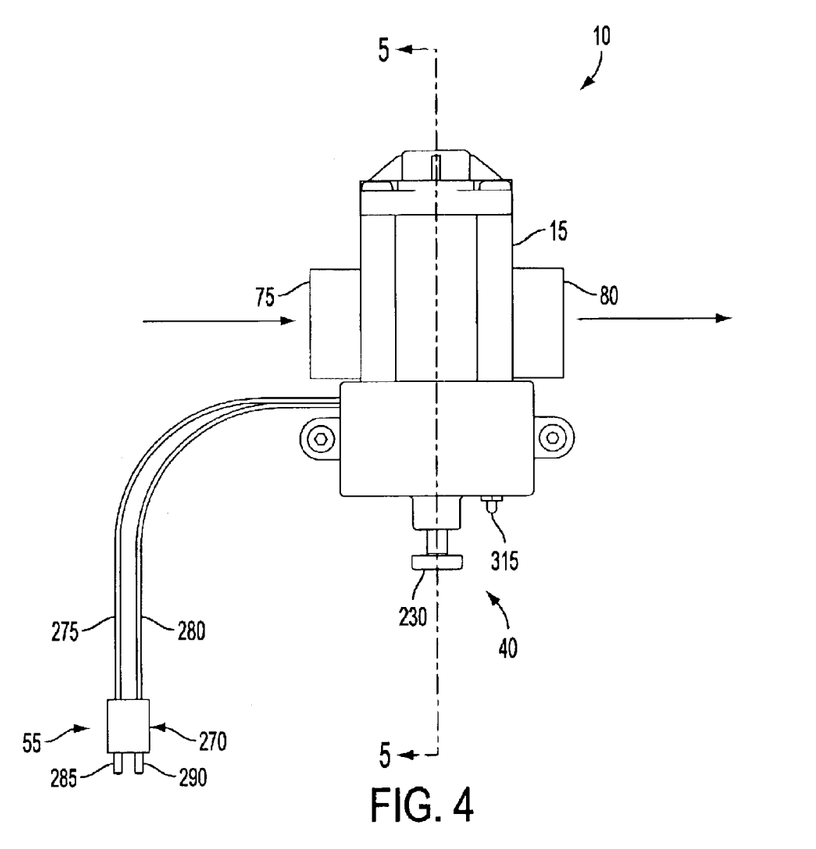
FIG. 4 is a side view of the control valve assembly taken along line 4—4 of FIG. 3.

In the exemplary embodiment shown, the control valve assembly further includes a separate manually-operated second push button 315 (FIG. 4). The second push button includes a latching electrical switch 320 (FIG. 16) that is operable to provide an operator signal to the electronic control module. In response to such operator signal, the electronic control module sends to the electromagnetic actuator the latching digital pulse of electrical current. The armature and the pole piece are latched together with only residual magnetism, after termination of such electrical current, only when the armature and the pole piece are at zero air gap or substantially zero air gap of one another.

The first pressure responsive means 65 is provided for generating a force in response to fluid pressure in the control valve assembly and the second pressure responsive means 70 is provided for generating an opposing force in response to fluid pressure in the control valve assembly.

The first pressure responsive means is connected between the valve housing and the first end portion of the movable member. The first pressure responsive means advantageously provides a positive fluid seal between the electromagnetic actuator and the fluid communicating between the first fluid connection port and the second fluid connection port. The first pressure responsive means has an effective area that is allowed to be in communication with the fluid and is approximately equal to the effective area of the valve port.

The second pressure responsive means is connected between the valve housing and the second end portion of the movable member. The second pressure responsive means advantageously provides a positive fluid seal between the non-electrical biasing device and the fluid communicating between the first fluid connection port and the second fluid connection port. The second pressure responsive means has an effective area that is allowed to be in communication with the fluid and is approximately equal to the effective area of the valve port.

The first pressure responsive means and the second pressure responsive means are operable to substantially dynamically balance the forces exertable on the valve and movable member by the fluid in both the opened and closed positions of the valve. In the exemplary embodiment shown in FIGS. 5–8, the first pressure responsive means includes a flexible first diaphragm 325 and the second pressure responsive means includes a flexible second diaphragm 330. Each of the first and second diaphragms are connected to the shaft of the movable member as well as connected to the valve housing. A diaphragm support 335 and e-ring clip 340 help connect the first diaphragm to the shaft. The diaphragm support may be formed, for example, from a tough rigid plastic material such as acrylonitrile-butadiene-styrene (ABS) or other suitable material.

It will be appreciated that the valve contacts the annular valve seat over a relatively small but finite annular area. If the two diaphragms have equal effective areas exposed to the fluid, then the control valve assembly will be completely fluid pressure balanced when the valve is in its fully opened position. The control valve assembly will also be slightly fluid pressure imbalanced when the valve is in its fully closed position because of the area of valve seat contact not exposed to fluid pressure. Alternatively, the diaphragm adjacent to the second fluid connection port can have an effective area exposed to the fluid equal to the inner, open, cross-sectional area of the valve port and the diaphragm adjacent to the first fluid connection port can have an effective area exposed to the fluid equal to the inner, open cross-sectional area of the valve port plus the area of valve seat contact. In such case, the control valve assembly will be completely fluid pressure balanced while the valve is at its fully closed position and slightly fluid pressure imbalanced when the valve is at its fully opened position due to the slight difference in the aforementioned effective areas of each diaphragm. The relative diaphragm areas may be adjusted to provide a compromise with lesser imbalance in both the opened and closed positions. The dimension D (FIG. 8) of each diaphragm may be, for example, about 0.845 inches (about 21.5 millimeters) to help define the effective area of each diaphragm. It will also be appreciated that this imbalance can be minimized by minimizing the area of valve seat contact, such as by the exemplary annular knife-like edge of the valve seat. As shown in FIG. 10, the annular outer edge of the valve seat may be tapered at an angle A relative to the horizontal plane of the valve. In the exemplary embodiment show, the angle A is about 30°. Such substantially fluid pressure balanced feature of the control valve assembly advantageously improves the energy efficiency and reliability of the control valve assembly by requiring only relatively small forces to move the valve or to maintain the valve in its fully opened or fully closed position. In the exemplary embodiment show, the first and second diaphragms are each formed of a rubber material, such as Buna N, and a reinforcing fabric material, such as F02 polyester fabric.

Industrial Applicability

The subject control valve assembly 10 is capable of operating as an automatic fluid shutoff valve for various household and commercial applications in the event one or more conditions necessitating valve closure are sensed. The control valve assembly of the present invention is particularly useful for conserving fluid as well as preventing damage to adjacent items in applications having one or more appliances or other devices operable to utilize fluid but susceptible to possible failure and resultant undesirable fluid leakage.

In the exemplary embodiment shown in FIG. 2, the fluid is water and the appliance 100 is a water heater. The first fluid connection port 75 of the control valve assembly 10 is connected to the source 95 of fluid, such as a pressurized utility water line or water well line, and the second fluid connection port 80 of the control valve assembly is connected to a fluid inlet line or passage 345 of the appliance. The control valve assembly may be, for example, installed upstream of the appliance or made integral with the appliance. Other possible appliances include, but are not limited to, boilers, washing machines, refrigerators, ice makers, water dispensers, dishwashers, toilets, bidets, sinks, bathtubs, showers, hot tubs, whirlpools, saunas, steam rooms, radiant floor heat fluid systems, humidifiers, water sprinklers, and/or other fluid using devices. Of course, the control valve assembly may be used with many other types of fluids besides water, such as chemical or industrial fluids.

Figure 18:
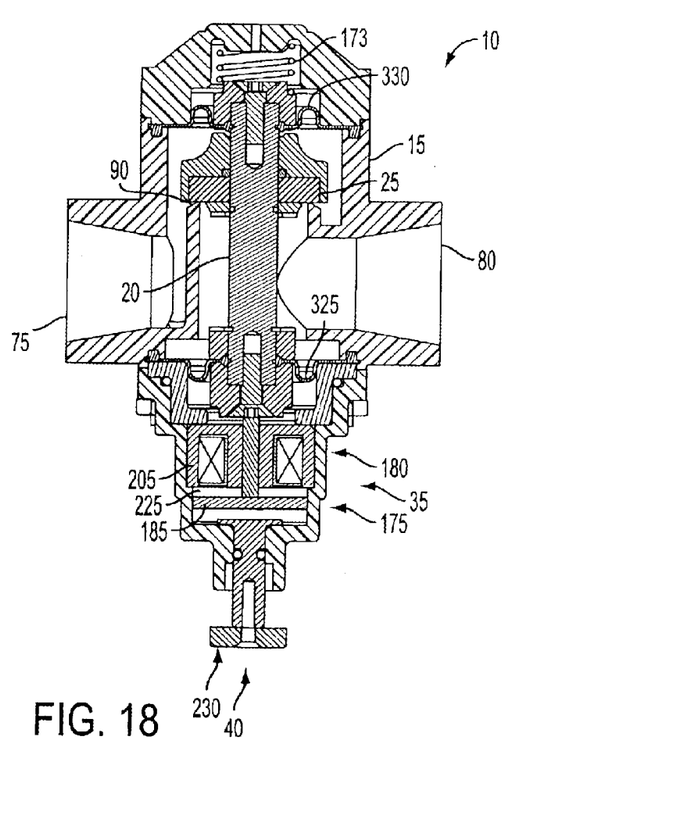
FIG. 18 is a view similar to FIG. 17 but showing the internal valve of the control valve assembly at its fully closed position.

An exemplary method of operation will now be described by referring to FIGS. 16–18 although it should be understood that the subject control valve assembly 10 is capable of other types of operation.

Figure 16:
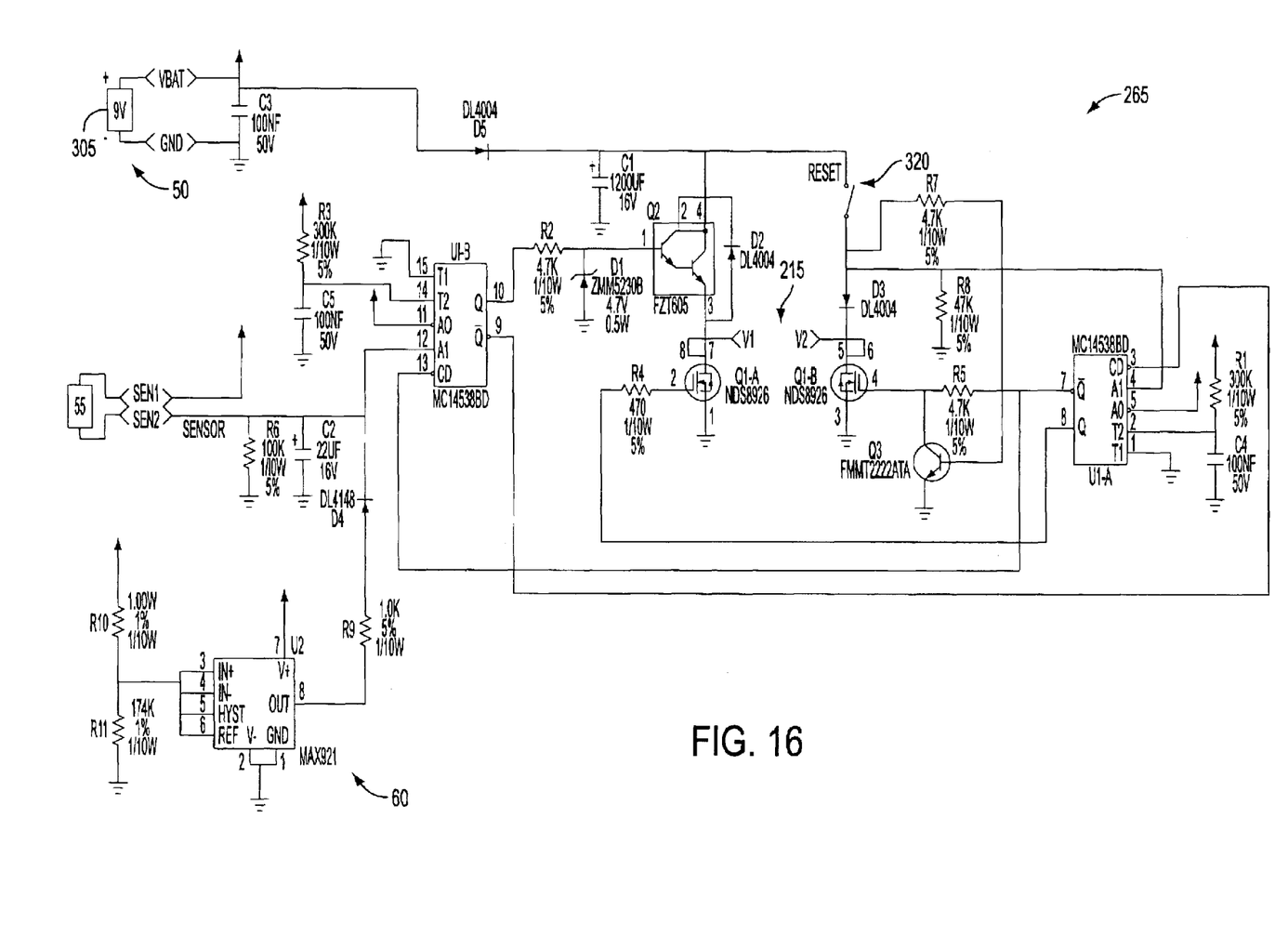
FIG. 16 is a schematic view of an exemplary controller circuit for the electronic control module of the control valve assembly shown in FIG. 5.

Referring to FIG. 16, the exemplary electronic control circuit 265 for the electronic control module 45 is shown. The electronic control circuit provides two basic functions: i) to latch the armature 185 (of the armature portion 175) and the pole piece 205 (of the stator portion 180) together (with the valve 25 at its fully opened position) with only residual magnetism after the armature is manually moved to zero air gap (or at least substantially zero air gap) with the pole piece and ii) to unlatch the armature and the pole piece from such residual magnetism in response to sensing one or more environmental condition sensor input(s) and/or low battery condition.

If the armature is moved to zero air gap (or at least substantially zero air gap) relative to the pole piece, latching with only residual magnetism is obtained by an operator manually pushing the second push button 315 that in turn closes the latching electrical switch 320. Alternatively, the second push button may be eliminated if the latching electrical switch is arranged to be automatically closed in response to the armature arriving at the zero air gap or substantially zero air gap state between the armature and the pole piece. In any event, closing the latching electrical switch provides a trigger signal to an integrated circuit U1-A, a one-shot timer. Integrated circuit U1-A provides a digital pulse (i.e., fixed duration) of electrical current to the coil 215 (or V1-V2) of the electromagnetic actuator 35 in order to latch together the armature and the pole piece with only residual magnetism. The one-shot timer advantageously prevents excessive draining of power from the replaceable battery 305 provided for the electronic control circuit. The time duration of the latching pulse is controlled by timing components that include a resistor R1 and a capacitor C4. The latching pulse from integrated circuit U1-A is applied to the gate of a transistor Q1-A through a current limiting resistor R4. This provides an electrical current path through the coil 215 (or V1-V2), the latching electrical switch 320, a diode D3, and the transistor Q1-A. Such latching advantageously consumes less electrical power than conventional control valves that require a continuous supply of electrical current to maintain the opened position of the valve.

In order to unlatch the armature from the pole piece (so that the return spring 173 is allowed to move the movable member 20 so that the valve 25 is simultaneously moved to its fully closed position), the inverse of the latching pulse of electrical current from integrated circuit U1-A is applied to the gate of a transistor Q1-B through a current limiting resistor R5, and to a chip disable input CD of an integrated circuit U2-B. This prevents the unlatch portion of the electrical circuit from engaging during the latching operation to help avoid a short circuit of the battery 305 and possible damage to transistors Q1 and Q2. Another feature of the latch portion of the electrical circuit is the sub circuit comprising a transistor Q3, a resistor R7, and a resistor R8. The combination and arrangement of these last three components helps prevent the latch and unlatch portion from engaging at the same time if the unlatching digital pulse of electrical current is already in progress and the latching electrical switch 320 is closed by keeping transistor Q1-B's gate pulled to ground.

One method of triggering unlatching is by applying a significantly low enough resistance across a sensor input SEN1-SEN 2 for a predetermined period of time. The magnitude of the required applied resistance is controlled by a resistor R6. The predetermined period of time (in order to avoid false signals) is controlled by the sensor resistance, the resistor R6, and a capacitor C2. Integrated circuit U1-B provides an unlatching digital pulse (i.e., fixed duration) of electrical current in response to the presence of the above trigger conditions. The duration of this unlatching digital pulse is controlled by a resistor R3 and a capacitor C5. The unlatching digital pulse drives transistor Q2 on through the combination of a resistor R2, and a diode D1. The resistor R2 and the diode D1 limit the voltage on the base of the transistor Q2, which in turn limits the voltage across and electrical current through the coil 215 (or V1-V2) when unlatching. This tailoring of the coil waveform advantageously prevents overdriving and relatching the armature and pole piece together. In other words, it gives enough time for the return spring 173 to work and thereby effectively separate the armature from contact with the pole piece well beyond a substantially zero air gap. Electrical current to unlatch the valve flows through the transistor Q2 and the transistor Q1-B when unlatching. The inverse (i.e., unlatching) digital pulse from integrated circuit U1-B is applied to the chip disable input CD of integrated circuit U1-A to prevent a latching operation when the armature and the pole piece are being unlatched from residual magnetism.

Another optional method of triggering unlatching is to do it in response to the voltage, across the terminals of the battery 305, dropping below a predetermined threshold. This predetermined threshold is controlled by a resistor R10, a resistor R11, and the internal reference built into an integrated circuit U2. At the time at which the battery voltage drops below the predetermined threshold, the comparator output of the integrated circuit U2 provides a trigger signal to the integrated circuit U1-B through a resistor R9, and a diode D4. The resistor R9 limits the electrical current from the comparator. The diode D4 prevents the output of the comparator from interfering with the operation of the one or more environmental condition sensor(s) 55. Once a trigger signal is applied to integrated circuit U1-B, the operation is the same as the preceding paragraph.

A capacitor C3 shunts possible high frequency noise signals picked up by leads VBAT-GND of the battery 305 thereby advantageously reducing the probability of such signals interfering with the operation of the electrical circuit. A capacitor C1 stores electrical energy for the latching and unlatching operations. The 9 volt battery 305 connected to this electrical circuit may have relatively high internal resistance compared to the electromagnetic actuator. Capacitor C1 is provided to compensate for this. A diode D5 provides isolation to prevent the electrical energy stored in capacitor C1 from flowing back to the battery terminals VBAT-GND and sensing circuit for low battery condition. This isolation also prevents the low battery detection circuit from sensing the electrical energy stored in capacitor C1. It also prevents capacitor C1 from electrically discharging if there is a malfunction at the battery terminals VBAT-GND, such as an electrical short.

One method of operating the fluid control valve assembly 10 includes the steps of biasing the valve 25 to its closed position whereat the armature 185 of the armature portion 175 is spaced away from the pole piece 205 of the stator portion 180 a distance greater than substantially zero air gap; opening the valve by manually moving the armature to contact the pole piece with zero air gap or substantially zero air gap therebetween; maintaining the valve at its opened position by latching together, with only residual magnetism, the armature and the pole piece only when there is zero air gap or substantially zero air gap therebetween; and closing the valve by canceling at least enough of the residual magnetism between the armature and the pole piece to allow the biased valve to be moved to its closed position.

The step of opening the valve includes the step of manually pushing the first push button 230 to directly contact the armature and then to directly push the armature, without lost motion and without electrical current, into contact with the pole piece so that there is zero air gap or substantially zero air gap therebetween.

The step of maintaining the valve at its opened position includes the step of sending a latching digital pulse of electrical current to the electromagnetic actuator 35 to latch together the armature and the pole piece only with residual magnetism after termination of the electrical current. The step of maintaining the valve at its opened position further includes the step of manually closing the latching electrical switch 320, by manually pushing the second push button 315, in order to trigger the latching digital pulse of electrical current to the electromagnetic actuator.

The step of closing the valve includes the step of sending an unlatching digital pulse of reverse electrical current to the electromagnetic actuator to cancel at least enough of such residual magnetism between the armature and the pole piece to allow the biased valve to be moved to its closed position. The step of closing the valve includes the step of sensing 55,56 for at least one condition necessitating closure of the valve and sending the unlatching digital pulse of reverse electrical current to the electromagnetic actuator in response to the sensed at least one condition.

Other aspects, objects, and advantages of this invention can be obtained from a study of the drawings, the disclosure, and the appended claims.

I claim:

1. A manually-opened and latchable, with only residual magnetism, two-way two-position fluid control valve assembly operable to selectively open and block fluid flow therethrough, comprising:

a valve housing defining a first fluid connection port, a second fluid connection port, and a valve port having an effective flow area, a first side, and an opposite second side;

a movable member positioned within the valve housing and having a first end portion and a second end portion, the movable member extending through the valve port with the first end portion of the movable member extending through the first side of the valve port;

a valve connected to the movable member between the first and second end portions, the valve located adjacent to the second side of the valve port, the movable member and the valve being selectively movable together to i) an opened position at which the valve opens the valve port to allow fluid communication between the first fluid connection port and the second fluid connection port and ii) a closed position at which the valve blocks the valve port to block fluid communication between the first fluid connection port and the second fluid connection port;

biasing means for biasing the movable member so that the movable member and the valve are biased to their closed position;

an electromagnetic actuator including an armature and a pole piece, the armature being selectively movable i) to contact the pole piece and ii) to be spaced away from the pole piece, the armature able to transfer movement to the first end portion of the movable member such that i) the valve is at its opened position when the armature contacts the pole piece and ii) the valve is at its closed position when the armature is spaced away from the pole piece, the electromagnetic actuator being minimized in capacity so that it is incapable of electromagnetically moving the armature towards the pole piece when the armature and the pole piece define an air gap therebetween greater than substantially zero, the electromagnetic actuator operable to selectively i) receive a latching digital pulse of electrical current and thereby latch together, with only residual magnetism, the armature and the pole piece only when the armature and the pole piece are located at zero air gap or substantially zero air gap of each other and ii) receive an unlatching digital pulse of reverse electrical current and thereby permanently cancel at least enough of such residual magnetism to allow the biasing means to move the movable member so that the valve is moved to its closed position while the armature moves away from the pole piece; and a manually-operated reset device operable to manually open the valve by moving the armature into contact with the pole piece and then by moving the armature, without lost motion, until there is at least substantially zero air gap between the armature and the pole piece.

2. A manually-opened and latchable, with only residual magnetism, two-way two-position fluid control valve assembly operable to only selectively open and block fluid flow therethrough, comprising:

a valve housing defining an external first fluid connection port, an external second fluid connection port, and an internal valve port having an effective flow area, a first side, and an opposite second side;

a movable rigid force transfer member positioned within the valve housing and having a first end portion and a second end portion, the movable member extending through the valve port with the first end portion of the movable member extending through the first side of the valve port;

exactly one poppet valve rigidly connected to the movable member between the first and second end portions, the valve located adjacent to the second side of the valve port, the movable member and the valve being selectively movable together between i) a fully opened position at which the valve is spaced away from the valve port to allow fluid communication between the first fluid connection port and the second fluid connection port and ii) a fully closed position at which the valve is positively seated against the valve port to completely block fluid communication between the first fluid connection port and the second fluid connection port;

a non-electrical biasing means for biasing the movable member so that the movable member and the valve are biased towards their fully closed position;

an electromagnetic actuator including an armature and a stationary pole piece directly facing the armature, the armature being selectively movable i) to contact the pole piece and ii) to be spaced away from the pole piece, the armature able to transfer movement to the first end portion of the movable member such that i) the valve is at its fully opened position when the armature contacts the pole piece and ii) the valve is at its fully closed position when the armature is spaced away from the pole piece, the electromagnetic actuator being minimized in capacity so that it is incapable of electromagnetically moving the armature towards the pole piece when the armature and the pole piece define an air gap therebetween greater than substantially zero, the electromagnetic actuator operable to selectively i) receive a latching digital pulse of electrical current and thereby latch, with only residual magnetism after termination of such electrical current, the armature and the pole piece together but only when the armature and the pole piece are located at at least substantially zero air gap of each other and ii) receive an unlatching digital pulse of reverse electrical current and thereby permanently cancel at least enough of such residual magnetism to allow the biasing means to move the movable member so that the valve is moved to its fully closed position while the armature moves away from the pole piece a distance greater than substantially zero air gap; and a manually-operated reset device operable to manually open the valve by moving the armature into contact with the pole piece and then by moving the armature, without lost motion, until there is at least substantially zero air gap between the armature and the pole piece.

3. The control valve assembly of claim 2, wherein the first fluid connection port of the valve housing is an inlet port adapted to be connected to a source of fluid and the second fluid connection port of the valve housing is an outlet port adapted to be connected to a fluid-using device.

4. The control valve assembly of claim 2, wherein the valve housing includes an annular valve seat circumscribing the valve port, the valve seat being tapered to form an annular knife-like edge so that the area of contact between the valve and the valve seat is minimized when the valve is at its fully closed position.

5. The control valve assembly of claim 2, wherein the valve housing is formed of a tough rigid plastic material.

6. The control valve assembly of claim 5, wherein said plastic material of the valve housing is acrylonitrile-butadiene-styrene (ABS).

7. The control valve assembly of claim 2, wherein the movable member includes a shaft formed of a stainless steel alloy material.

8. The control valve assembly of claim 7, wherein the stainless steel alloy material of the shaft is 303 stainless steel.

9. The control valve assembly of claim 2, wherein the valve is formed from a rubber material that is relatively more compliant than the valve seat of the valve housing.

10. The control valve assembly of claim 9, wherein the rubber material of the valve is formed of Buna N having a hardness in the range of about 70 to 75 Shore.

11. The control valve assembly of claim 2, wherein the non-electrical biasing device includes a mechanical return spring arranged to bias the second end portion of the movable member so that the valve is biased to its fully closed position.

12. The control valve assembly of claim 2, wherein each of the armature and the pole piece being formed of non-permanent magnetic material which i) in response to the latching digital pulse of electrical current, can selectively develop enough residual magnetism to maintain the armature in contact with the pole piece so that the valve is maintained at its fully opened position even after electrical current to the electromagnetic actuator is terminated and ii) in response to the unlatching digital pulse of reverse electrical current permanently cancels at least enough residual magnetism to allow the biasing means to move the movable member so that the valve is moved to its fully closed position while the armature moves away from the pole piece.

13. The control valve assembly of claim 12, wherein the non-permanent magnetic material of each of the armature and the pole piece is AISI 4140 hardened steel alloy.

14. The control valve assembly of claim 2, wherein the reset device includes an externally disposed and manually-operated first push button operable to directly push the armature without electrical energy into contact with the pole piece with at least substantially zero air gap therebetween.

15. The control valve assembly of claim 14, wherein the push button includes a reset pin having an enlarged flat end portion directly facing the armature of the electromagnetic actuator.

16. The control valve assembly of claim 15, wherein the reset pin is formed from nonmagnetic tough rigid plastic material.

17. The control valve assembly of claim 16, wherein the plastic material of the reset pin is acrylonitrile-butadiene-styrene (ABS).

18. The control valve assembly of claim 14, wherein the push button further includes a mechanical spring to bias the reset pin away from the armature.

19. The control valve assembly of claim 2, further including an electronic control module positioned within the valve housing and operable to selectively send to the electromagnetic actuator one of i) the latching digital pulse of electrical current to latch the armature and the pole piece together with only residual magnetism after such electrical current is terminated and ii) the unlatching digital pulse of reverse electrical current to cancel at least enough residual magnetism to allow the biasing means to move the movable member so that the valve is moved to its fully closed position while the armature moves away from the pole piece.

20. The control valve assembly of claim 19, further including at least one sensor operable to sense for a condition necessitating closure of the valve and provide a signal indicative of such sensed condition to the electronic control module which, in response, is operable to send the unlatching digital pulse of reverse electrical current to the electromagnetic actuator to allow closure of the valve by the biasing means.

21. The control valve assembly of claim 19, further including a source of electrical current operable to supply electrical power to the electronic control module.

22. The control valve assembly of claim 21, wherein the source of electrical current includes a replaceable direct-current battery, said battery positioned within the valve housing and operable to provide electrical current to the electronic control module.

23. The control valve assembly of claim 22, further including a sensor operable to send to the electronic control module a signal indicative of the voltage across the battery, the electronic control module operable to send to the electromagnetic actuator the unlatching digital pulse of reverse electrical current, to allow closure of the valve by the biasing means, in response to the signal indicating the voltage has fallen below a predetermined level.

24. The control valve assembly of claim 19, further including a manually-operated latching electrical switch operable to provide another signal to the electronic control module which, in response, sends to the electromagnetic actuator the latching digital pulse of electrical current to latch the armature and the pole piece together with only residual magnetism upon termination of such electrical current only when the armature and the pole piece are at at least substantially zero air gap of one another.

25. The control valve assembly of claim 2, further including a first pressure responsive means for generating a net first force in response to fluid pressure in the control valve assembly and a second pressure responsive means for generating an opposing net second force in response to fluid pressure in the control valve assembly, wherein the net first force and the opposing net second force are substantially equal, the first pressure responsive means being connected between the valve housing and the first end portion of the movable member, the first pressure responsive means having an effective area that is allowed to be in communication with the fluid and is approximately equal to the effective area of the valve port, the second pressure responsive means being connected between the valve housing and the second end portion of the movable member, the second pressure responsive means having an effective area that is allowed to be in communication with the fluid and is approximately equal to the effective area of the valve port, the first pressure responsive means and the second pressure responsive means operable to substantially dynamically balance the forces exertable on the valve and movable member by the fluid.

26. The control valve assembly of claim 25, wherein the first pressure responsive means provides a positive seal between the electromagnetic actuator and fluid communicating between the first fluid connection port and the second fluid connection port.

27. The control valve assembly of claim 26, wherein the second pressure responsive means provides a positive seal between the non-electrical biasing device and fluid communicating between the first fluid connection port and the second fluid connection port.

28. The control valve assembly of claim 27, wherein the first pressure responsive means includes a first flexible diaphragm and the second pressure responsive means includes a second flexible diaphragm.

29. The control valve assembly of claim 28, wherein the first diaphragm and second diaphragm are each formed of a rubber material and a reinforcing fabric material.

30. The control valve assembly of claim 29, wherein the rubber material of each diaphragm is Buna N and the reinforcing fabric material of each diaphragm is F02 polyester fabric.

31. A fluid system, comprising:
an appliance operable to utilize fluid and having a fluid inlet passage; and
a manually-opened and latchable, with only residual magnetism, two-way two-position fluid control valve assembly operable to selectively open and block fluid flow therethrough, said control valve assembly including a valve housing, a movable member, exactly one valve, a biasing means for biasing the movable member, an electromagnetic actuator, a manually-operated reset device, an electronic control module, and at least one sensor, said valve housing defining an inlet port adapted to be connected to a source of fluid, an outlet port connected to the fluid inlet passage of the appliance, and an internal valve port having an effective flow area, a first side, and an opposing second side, said movable member positioned within the valve housing and having a first end portion and a second end portion, the movable member extending through the valve port with the first end portion of the movable member extending through the first side of the valve port, said valve connected to the movable member between the first and second end portions, the valve located adjacent to the second side of the valve port, the movable member and the valve being selectively movable together to i) a fully opened position at which the valve opens the valve port to allow fluid communication between the inlet port and the outlet port and ii) a fully closed position at which the valve completely blocks the valve port to completely block fluid communication between the inlet port and the outlet port, said biasing means biasing the movable member so that the movable member and the valve are biased to their closed position, said electromagnetic actuator including an armature and a pole piece, the armature being selectively movable i) to contact the pole piece and ii) to be spaced away from the pole piece, the armature portion able to transfer movement to the first end portion of the movable member such that i) the valve is at its fully opened position when the armature contacts the pole piece and ii) the valve is at its fully closed position when the armature is spaced away from the pole piece, the electromagnetic actuator being minimized in capacity so that it is incapable of electromagnetically moving the armature towards the pole piece when the armature and the pole piece define an air gap therebetween greater than substantially zero, the electromagnetic actuator operable to selectively i) receive a latching digital pulse of electrical current and thereby latch together, with only residual magnetism, the armature and the pole piece but only when the armature and the pole piece are located at at least substantially zero air gap of each other and ii) receive an unlatching digital pulse of reverse electrical current and thereby permanently cancel at least enough of such residual magnetism to allow the biasing means to move the movable member so that the valve is moved to its fully closed position while the armature moves away from the pole piece, said manually-operated reset device operable to manually open the valve by directly contacting the armature then by pushing the armature, without lost motion, until there is at least substantially zero air gap between the armature and the pole piece, said electronic control module positioned within the valve housing and operable to selectively send to the electromagnetic actuator one of i) the latching digital pulse of electrical current to latch together the armature and the pole piece with only residual magnetism after termination of such electrical current and ii) the unlatching digital pulse of reverse electrical current to cancel at least enough residual magnetism to allow the biasing means to move the movable member so that the valve is moved to its fully closed position while the armature moves away from the pole piece, said sensor operable to sense for a condition necessitating closure of the valve and provide a corresponding signal to the electronic control module which, in response, sends to the electromagnetic actuator the unlatching digital pulse of reverse electrical current to allow closure of the valve by the biasing means.

32. The fluid system of claim 31, wherein said appliance is selected from the group of water heaters, boilers, washing machines, refrigerators, ice makers, water dispensers, dishwashers, toilets, bidets, sinks, bathtubs, showers, hot tubs, whirlpools, saunas, steam rooms, radiant floor heat fluid systems, humidifiers, and water sprinklers.

33. A method of operating a manually-opened and latchable, with only residual magnetism, two-way two-position fluid control valve assembly operable to selectively open and completely block fluid flow therethrough, said control valve assembly including a valve and an electromagnetic actuator having a movable armature and a stationary pole piece, said method comprising the steps of:

biasing the valve to its fully closed position whereat the armature is spaced away from the pole piece a distance greater than substantially zero air gap;

opening the valve by manually moving the armature to contact the pole piece with at least substantially zero air gap therebetween;

maintaining the valve at its fully opened position by latching together, with only residual magnetism, the armature and the pole piece only when there is at least substantially zero air gap therebetween; and closing the valve by canceling at least enough of the residual magnetism between the armature and the pole piece to allow the biased valve to be moved to its fully closed position.

34. The method of claim 33, wherein the step of opening the valve includes the step of manually pushing a first push button to directly contact the armature and then to push the armature, without lost motion and without electrical current, into contact with the pole piece so that there is at least substantially zero air gap therebetween.

35. The method of claim 33, wherein the step of maintaining the valve at its fully opened position includes the step of sending a latching digital pulse of electrical current to the electromagnetic actuator to latch together the armature and the pole piece with only with residual magnetism after termination of such electrical current.

36. The method of claim 35, wherein the step of closing the valve includes the step of sending an unlatching digital pulse of reverse electrical current to the electromagnetic actuator to cancel at least enough of such residual magnetism between the armature and the pole piece to allow the biased valve to be moved to its fully closed position.

37. The method of claim 36, wherein the step of closing the valve includes the step of sensing for at least one condition necessitating complete closure of the valve and sending said unlatching digital pulse of reverse electrical current to the electromagnetic actuator in response to said sensed at least one condition.

38. The method of claim 37, wherein said sensed at least one condition is selected from the group of fluid leakage, excessive fluid flow, excessive time duration of fluid flow, fluid flooding, undesirable temperatures, undesirable pressures, undesirable ph values, smoke, fire, seismic events, explosions, and low battery condition.

* * * * *